(12) United States Patent
Klingauf et al.

(10) Patent No.: US 6,405,959 B1
(45) Date of Patent: Jun. 18, 2002

(54) SAFETY BELT WITH BELT TAUTENER

(75) Inventors: Gerhard Klingauf, Balzheim; Joachim Nüsseler, Langenau; Christian Vogel, Ulm, all of (DE)

(73) Assignee: Takata (Europe) Vehicle Safety Technology GmbH, Ulm (DE)

( * ) Notice: Subject to any disclaimer, the term of this patent is extended or adjusted under 35 U.S.C. 154(b) by 0 days.

(21) Appl. No.: 09/512,453

(22) Filed: Feb. 24, 2000

(30) Foreign Application Priority Data

Feb. 24, 1999 (DE) .......................................... 199 07 962

(51) Int. Cl.$^7$ .............................................. B60R 22/46
(52) U.S. Cl. ...................... 242/374; 280/806; 297/478
(58) Field of Search ..................... 242/374; 280/806; 297/478

(56) References Cited

U.S. PATENT DOCUMENTS

| | | | | |
|---|---|---|---|---|
| 4,455,000 A | * | 6/1984 | Nilsson | 242/374 |
| 4,568,037 A | * | 2/1986 | Kawaguchi et al. | 242/372 |
| 4,592,520 A | * | 6/1986 | Kawaguchi | 242/372 |
| 5,443,222 A | | 8/1995 | Mödinger et al. | |
| 5,451,008 A | * | 9/1995 | Hamaue | 242/374 |
| 5,526,996 A | | 6/1996 | Ebner et al. | |
| 5,628,469 A | * | 5/1997 | Fohl | 242/374 |
| 5,730,384 A | * | 3/1998 | Fohl | 242/374 |
| 5,794,875 A | * | 8/1998 | Schmid | 242/374 |
| 6,244,531 B1 | * | 6/2001 | Hori et al. | 242/374 |

FOREIGN PATENT DOCUMENTS

| | | |
|---|---|---|
| DE | 2 249 556 | 10/1972 |
| DE | 42 27 781 A 1 | 8/1992 |
| DE | 43 31 027 A 1 | 9/1993 |
| DE | 196 09 524 A 1 | 3/1996 |
| GB | 2 205 223 | 12/1988 |
| JP | 10-95309 | 4/1998 |

* cited by examiner

Primary Examiner—Donald P. Walsh
Assistant Examiner—Daniel K Schlak
(74) Attorney, Agent, or Firm—Foley & Lardner

(57) ABSTRACT

The invention relates to a safety belt apparatus, in particular for motor vehicles, comprising a safety belt (11) which is connected on the one hand via a belt lock (12) to the vehicle body (13) and on the other hand to a belt winder (14) which is attached to the vehicle body (13), and which has a belt roller (15) which is rotatable about a transverse axis (16) and onto which the belt (11) is wound up to a greater or lesser extent, which is stressed by a spring mechanism (17) in the belt roll-up direction and is connected to a belt tautener (18) as well as to an unwind blocking apparatus (19) which blocks the further drawing out of the belt in the attempt of a rapid belt drawing out and/or in accident caused accelerations at the latest after a limited further rotation of the belt roller (15), with a coupling (20) consisting of an input part (22), an output part (24) and coupling members (25) which are active between them being placed between the belt tautener (18) and the belt roller (15), which coupling (20) is normally open and closes at the beginning of the rotation of the belt tautener (18) after a triggering in order that the belt roller (15) can be abruptly driven in the wind-up direction by the belt tautener (18). The invention consists in that the coupling (20) can be automatically disengaged when the torque which acts on the belt roller (15) in the wind-up direction exceeds the torque which is exerted by the belt tautener (18).

25 Claims, 4 Drawing Sheets

SAFETY BELT WITH BELT TAUTENER

BACKGROUND OF THE INVENTION

The invention relates to a safety belt apparatus in particular for motor vehicles comprising a safety belt and a belt tautener. The safety belt can be a two-point or three-point safety belt, with one belt part being led from the vehicle body via a lock to a belt winder and comprising a connection. element extending from the releaseable lock part to the body of the vehicle.

The purpose of the belt winder is to exert a force on the belt roller in the wind up direction by means of a spring mechanism in order that in the unbuckled state the safety belt is largely wound in and does not lie too loosely in contact on the passenger. The purpose of the unwind blocking apparatus is to stop the further drawing out of the belt when an attempt is made to draw it out rapidly or in accident caused accelerations after a slight further rotation of the belt roller at the latest. The belt tautener is provided at the belt winder in order to abruptly rotate the belt roller by so many rotations in the wind up direction in an accident caused acceleration that the safety belt, which at first lies loosely at the vehicle passenger, is tautened in such a manner that the passenger does not fall in into the loosely fastened belt and injure himself in doing so.

Belt tauteners which are particularly suitable for the purposes of the invention are known from EP 581 288 B1 and U.S. Pat. No. 5,553,803.

Whereas the belt tautener is normally separated from the belt roller by a coupling, it is abruptly coupled to the belt roller in the event of a triggering in order to be able to initiate the belt tautening. A problem exists in that after the completion of the belt tautening it should be possible for the belt to be drawn out unhindered from the used belt tautener so that the driver can more easily free himself from the belt after the accident. In addition, in the case where the belt roller can still rotate somewhat relative to the blocked unwind blocking apparatus when the belt is drawn out, it is important to maintain this limited rotational movement of the belt roller as it damps the forward movement of the passenger.

SUMMARY OF THE INVENTION

An object of the invention is to provide a safety belt apparatus with a belt tautener in which the triggered and operated belt tautener no longer exerts a disadvantageous influence on the desired movements of the belt roller after a triggering event and the subsequent tautening of the belt.

An idea of the invention is that the belt roller, which is rotationally fixedly coupled in the wind-up direction to the belt tautener shaft during the belt tautening, is decoupled from the belt tautener after completion of the belt tautening. The decoupling occurs when the draw out force on the belt exceeds the tautener force so that a definite draw-out rotational movement of the belt roller, which is desirable after an accident, is not hindered by the still working or already expended belt tautener.

It is advantageously provided that a reversal of the rotational direction of the belt roller and/or drive of the belt tautener disengages the coupling.

The coupling drive affects that the closing or the engaging respectively of the coupling takes place through the rotation of the belt tautener immediately after a triggering.

The conducting-in member ensures a particularly operationally reliable, unobjectionable actuation of the coupling.

Both the disc and also the coupling members and the coupling ring can be designed to be very flat and thus to require little space in the axial direction.

The ratchet wheel ensures that the conducting-in and conducting-out abutments rotate with the coupling during a triggering, but are however held firmly at the beginning and end of a triggering so that in connection with the rotation of the disc in the one or the other direction they can reliably carry out the conducting-in and conducting-out, respectively, of the coupling members.

The invention provides a constructionally favorable and very operationally reliable measure to enable a rotation of the ratchet gear in the wind-up direction against a limited resistance and to completely suppress a backwards rotating of the ratchet gear.

Particularly important are the rotational spring elements which are effective in the framework of the rotational play.

The coupling ring which represents the output member of the coupling is expediently integrated into the belt roller.

The cut-out is expediently covered over by the coupling drive, which is preferably formed by the ratchet wheel and the components which are arranged at it.

It is particularly advantageous when a limited rotational play, which is in particular enabled by a torsional bar, is present between the unwind blocking apparatus and the belt roller and which enables the belt roller to make several rotations, in particular three to four rotations, in the event of an accident caused drawing force at the safety belt in order that the falling forwards of the passenger into an inflated airbag is preferably damped accordingly. The torsion bar is thus plastically, that is, lastingly deformed during the rotation under accident caused forces.

BRIEF DESCRIPTION OF THE DRAWINGS

The invention will be explained in the following with reference to the drawings; shown in these are.

DETAILED DESCRIPTION

Figure 1:
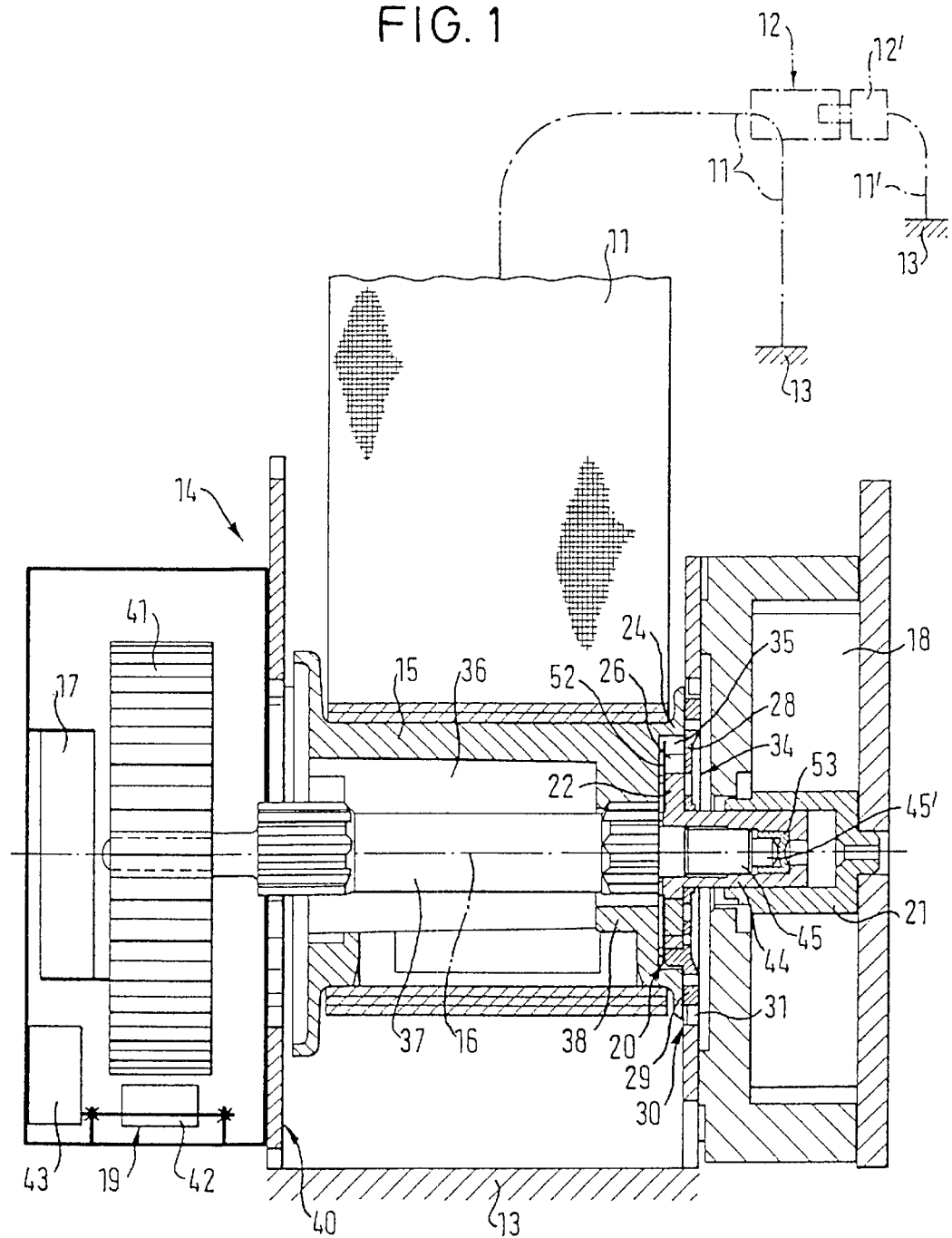
FIG. 1 a schematic vertical sectional view of the belt winder of a safety belt in accordance with the invention, with the safety belt, the lock and the draw member being merely schematically indicated in chain-dotted lines, FIG. 2 a perspective exploded view of the essential components of a belt winder in accordance with the invention, FIG. 3 an axial plan view of a preferred embodiment of the coupling in accordance with the invention and of the coupling drive which is arranged axially behind it, FIG. 4 a scaled down side view of the object in FIG. 3 without the inner tooth crown and coupling ring, with the coupling members being stressed in disengagement position as in FIG. 3, FIG. 5 a view as in FIG. 4, with however the outer teeth of the ratchet wheel being reproduced in the position which is radially inwardly pressed through the inner tooth crown of the housing and the coupling members being pressed into the engagement position of the coupling, FIG. 6 a view of the objects of FIGS. 4, 5 from the opposite side, with the outer teeth being located in an intermediate position between the positions in accordance with FIGS. 4 and 5 and FIG. 7 a plan view of the object in FIG. 6.

In accordance with FIG. 1 a three-point safety belt 11 is on the one hand partly rolled up onto a belt roller 15 of a belt winder 14 which is secured at the vehicle body 13 and is led to the vehicle body 13 on the other hand via a belt lock 12 which is merely indicated in chain-dotted lines. The releasable belt lock part 12' is likewise connected to the vehicle body via a draw member 11'.

The belt roller 15 is journalled at the vehicle-fixed housing 40 so as to be rotatable about a transverse axis 16. It has a cavity 36 which is open at the left and is closed off at the right by a front wall 38 and into which a torsion bar 37 extends from a ratchet wheel 41 of an unwind blocking apparatus 19 (which is provided at the left end side of the belt roller 15 up to the front wall 38) to a position close to a right end side of the belt roller 15; the right end of the torsion bar 37 is rotationally fixedly connected to the front wall 38 (which forms an integral constituent part of the belt roller 15). The ratchet wheel 41 cooperates with one or more pawls 42 which is or are, either in an attempt at a rapid drawing out of the belt 11 or in accident caused accelerations of the vehicle, brought through suitable control means 43 into such an engagement with the ratchet wheel 41 that an otherwise possible rotation of the ratchet wheel 41 in the belt draw-out direction is prevented.

Adjacent to the ratchet wheel 41 there is a spring mechanism 17 which is arranged on the one hand at the housing 40 and on the other hand at the ratchet wheel 41 in such a manner that a torque in the wind-up direction of the safety belt 11 is exerted on the torsion bar 37 and thus on the belt roller 15.

A belt tautener 18 is located at the housing 40 at the right end side of the belt roller 15; the belt tautener 18 facing away from the spring mechanism 17 and the unwind blocking apparatus 19. The belt tautener 18 is preferably pyrotechnically triggered and operated in the event of accident caused accelerations and exerts a torque which acts in the wind-up direction of the safety belt 11 on its output shaft 21 (which may be designed as a polygonal sleeve).

The shaft 21 is provided with a coaxial bore of approximately triangular cross-section which is open in the direction towards the belt roller 15 and in which an axle stump 44 (which has a complementary cross-section (FIGS. 1, 6, 7) and which extends from the right end of the belt roller 15) of a coupling 20 is rotationally fixedly engaged. In accordance with FIG. 1 the axle stump 44 is also designed to include a hollow cavity of circular cross-section and to open in the direction of the belt roller 15. The shaft end 45 of the belt roller 15 engages rotationally and extends from an end pin 45' of small diameter located in a bearing socket 53 which is provided in the cavity of circular cross-section.

Figure 6:
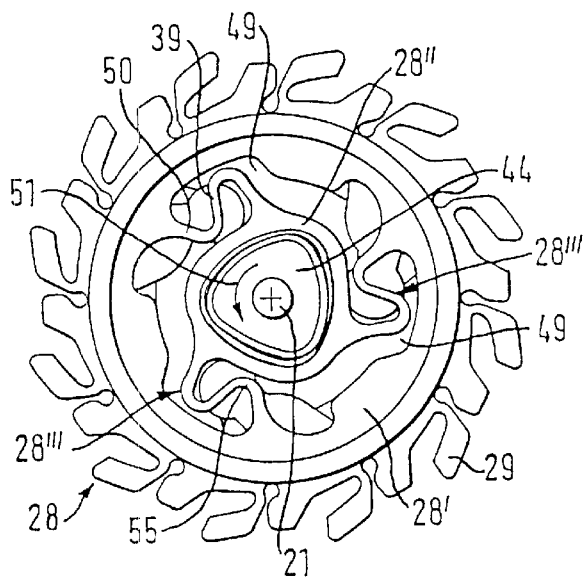
Figure 7:
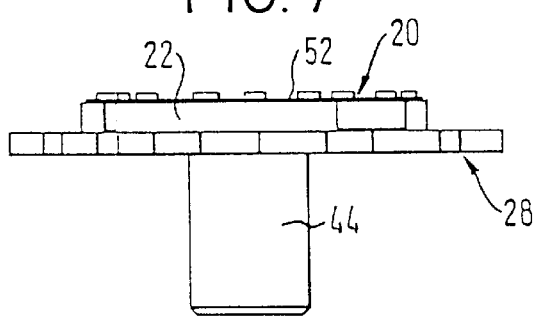

In accordance with FIGS. 1, 6 and 7 a ratchet wheel 28 with a significantly greater outer diameter than the coupling 20 sits on the axle stump 44 on the side facing away from the coupling 20. The ratchet wheel 28 and various components arranged thereon form a coupling drive 34.

In accordance with FIGS. 1 and 3 to 7, the coupling 20 consists of a circular disc 22 which is secured at the belt-roller-side end of the axle stump 44. The circular disc 22 has three cut-outs 23 therein each of which has a partly circular radial inner end. The cut-outs 23 are distributed over the disc's periphery and engage coupling members 25. The coupling members 25 are designed as claws (having a shape which is in particular visible in FIG. 3) and are arranged in such a manner that they can each pivot, to a limited extent, about respective axes 32; the axes 32 are parallel to the belt roller axis 16. The coupling members 25 are designed radially inwardly analogously to the cut-outs 23.

Radially outwardly the coupling members 25 are provided with clamping teeth 33 which cooperate with the inner wall of a surrounding coupling ring 24 which projects axially (as shown in FIG. 1) from the right side of the belt roller 15 (i.e. the side facing the belt tautener 18). It is preferable that the coupling ring 24 be integral with the right side of the belt roller 15. The ratchet wheel 28 is also substantially designed (in accordance with FIGS. 1 and 7) as a flat circle-like disc which lies in contact at the side of the disc 22 of the coupling 20 which faces away from the belt roller 15.

Figure 3:
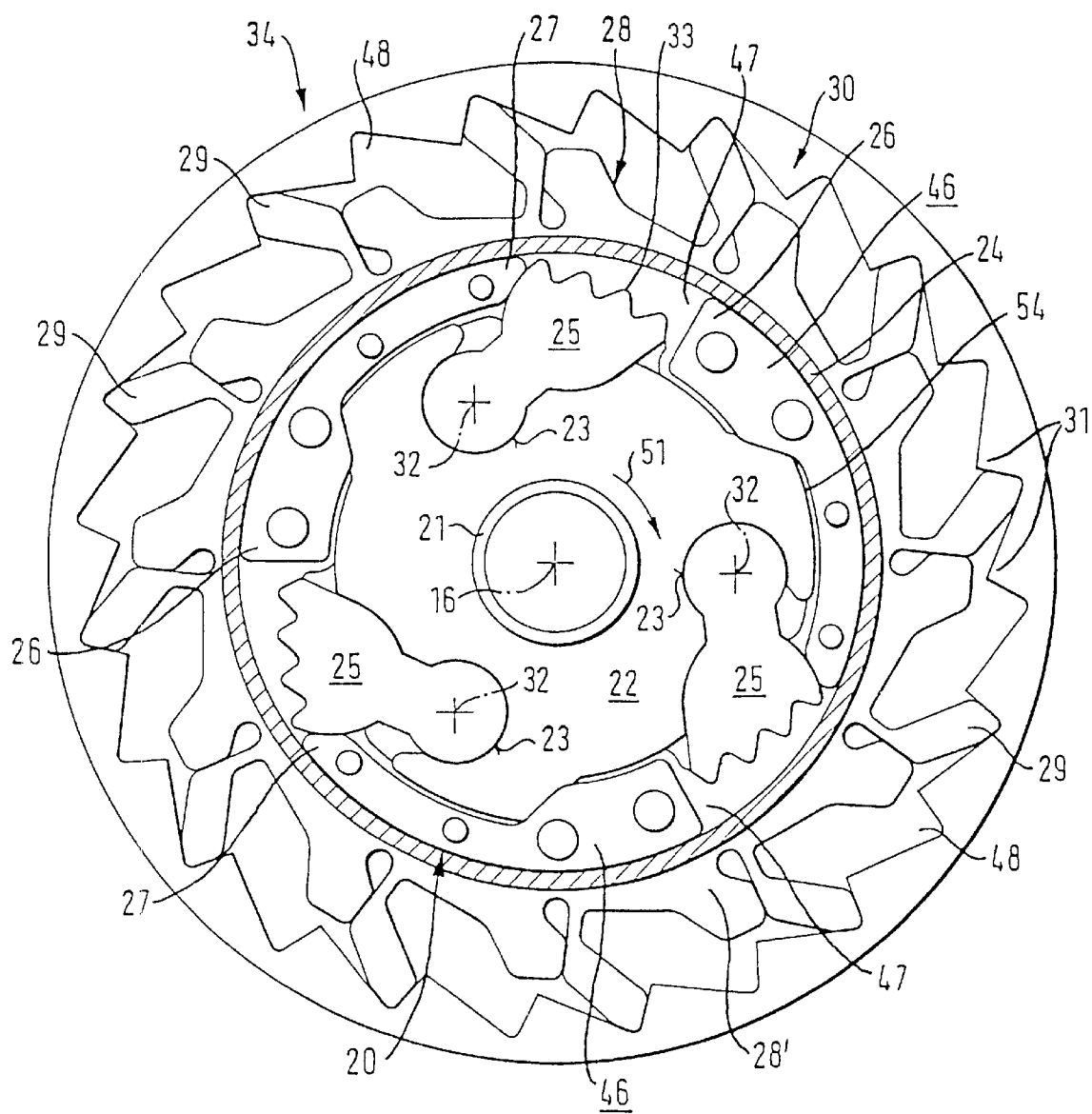
Figure 5:
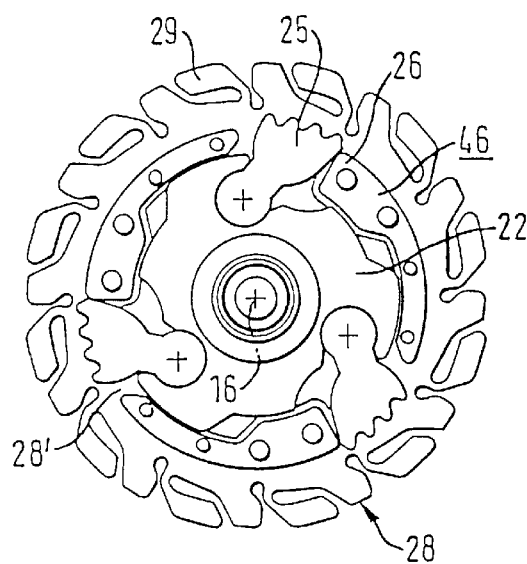
Figure 4:
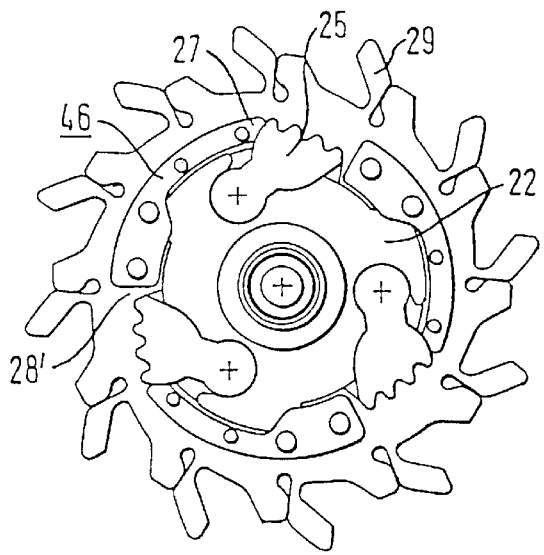

As shown in FIGS. 3 to 5, three abutment carrying elements 46 project from the surface of the ratchet wheel 28 facing the belt roller 15 and toward the belt roller 15. The abutment carrying elements 46 are designed to have substantially the shape of circular arcs. In addition, the abutment carrying elements 46 extend at an angle relative to the axis 16 such that between every two abutment carrying elements 46 there remains a gap 47; the coupling members 25 fit with the gaps 47 with peripheral clearance. The two ends of each abutment carrying element 46 form conducting-in and conducting-out abutments 26, 27 which can come selectively into engagement with the radially outer regions of the coupling members 25. Whereas the abutment carrying elements 46 are designed outwardly to be in the shape of circular arcs which are substantially concentric to the transverse axis 16, they have inwardly a retraction 54 which is located on the side of the conducting-out abutments 27. Through the retractions 54, a space saving accommodation of the coupling members 25 in the disc 22 is created.

On its outer periphery, the ratchet wheel 28 has outer teeth 29; the teeth 29 are pivotal about an axis parallel to the transverse axis 16. The teeth 29 engage depressions 48 between inner teeth 31 of an inner tooth crown 30; the inner tooth crown 30 being formed at the housing 40. The number of the inner teeth 31 is twice as great as that of the outer teeth 29 so that an outer tooth 29 of the ratchet wheel 28 engages only in every second tooth depression 48 of the inner tooth crown 30.

The ratchet wheel 28 is formed radially inwardly from the outer teeth 29 and is journalled on the axle stump 44. In accordance with FIG. 6, the ratchet wheel 28 consists of an outer part 28' (which has substantially the shape of a circular disc), an inner part 28" (which sits rotationally fixedly on the axle stump 44 and which forms part of an output drive of the belt tautener 18), and spring elements 28''' (which extend between the outer and inner parts 28', 28"). Three spring elements 28''' are distributed over the periphery of the ratchet wheel 28.

Starting from the inner part 28", each of the spring elements 28''' (which are integrally connected to the outer and inner parts 28', 28"): (a) first extends substantially radially outwardly into a corresponding cut-out 49 of the outer part 28', then (b) bends around inwardly by somewhat less than 180° in the tautening direction, and (c) finally merges via an inclined web 39 and a further curvature region 55 into a web 50 which projects radially inwardly from the outer part 28' into the cut-out 49.

The spring constant of the spring elements 28''' is chosen in comparison with the spring constant of the outer teeth 29 such that, when the axle stump 44 is rotated in the direction of the arrow 51 in FIG. 6, at first only the inner part 28" of the ratchet wheel 28 rotates, while partly pressing together the spring elements 28''' in the manner of an accordion, whereas the outer part 28' is held firmly against a rotation through mass inertia and the outer teeth 29 which engage into the tooth depressions 48 (FIG. 3). After the spring elements 28" are deformed to such an extent that a predetermined torque is exerted on the outer part 28', the outer teeth 29 unlatch from the latching depressions 48 and rotate into the next tooth depression.

It should be emphasized that the abutment carrying elements 46 are located adjacent the outer part 28' of the ratchet gear. Accordingly, during the first phase of the rotational movement of the axle stump 44 (up to the partial pressing together of the spring elements 28'''), the disc 22 of the coupling 20 rotates in the direction of the arrow 51 in FIG. 3 whereas the outer part 28' of the ratchet wheel 28 and the carrying abutments 46 at first remain stationary. During this phase of the movement the outer regions of the coupling members 25 approach the conducting-in abutments 26 and finally strike against the latter (FIG. 5). In a further relative rotation between the disc 22 and the outer part 28', the coupling members 25 pivot about their axes 32 (in the direction towards the inner wall of the coupling ring 24) until the clamping teeth 33 stand in firm engagement with the coupling ring 24. In a further rotation of the axle stump 44, the coupling members 25 force the coupling ring 24 and thus the belt roller 15 in a rotational movement in the direction of the arrow 51.

Since the outer part 28' participates in the rotational movement of the axle stump 44 when the spring elements 28''' are partially pressed together, the coupling disc 22 and the ratchet wheel 28 rotate together (as the coupling members 25 are in engagement with the coupling ring 24) until a predetermined belt force has been reached or the pyrotechnic charge of the belt tautener 18 has been consumed.

The coupling 20 thus remains engaged until the torque which is exerted on the belt roller 15 by the belt draw force (which may be produced, for example, by a passenger falling into the belt) exceeds the contrary torque of the belt tautener 18. When the torque exerted on the belt roller 15 exceeds the contrary torque, the coupling ring 24, while overcoming the torsion bar 37, forces the disc 22 in the belt draw-out direction via the coupling members 25. At the same time, the coupling members 25 are released from the conducting-in abutments 26 (while the ratchet wheel 28 remains stationary) and enter into engagement with the conducting-out abutments 27, thereby causing a disengagement of the coupling 20. At this time, the belt can still be drawn out, to a limited extent, under the braking influence of the unwind blocking apparatus 19 and the torsion bar 37.

As long as no force is exerted on the belt during the operation of the belt tautener 18, the torque on the axle stump 44 decreases and finally vanishes completely. Thereupon, the spring elements 28''', which are at first pressed together, can relax. In addition, with the outer part 28' being held firmly against rotation counter to the direction of the arrow 51 (through latching in of the outer teeth 29 into the tooth depressions 48 (FIG. 3)), the inner part 28'' in FIG. 6 can rotate counter to the direction of the arrow 51 by an amount such that the coupling members 25 are released from the conducting-in abutments 26 and then come into contact with the peripherally oppositely lying conducting-out abutments 27 (FIGS. 3, 4). Moreover, the coupling members 25 are pivoted about their axes 32 (clockwise in FIG. 3) in such a manner that the clamping teeth 33. come out of engagement with the inner wall of the coupling ring 24. At this time, the belt roller 15 can be rotated by the run out belt tautener 18 without hindrance as permitted by the spring mechanism 17 (FIG. 1), the unwind blocking apparatus 19, the torsion bar 37 and the draw forces which are exerted on the safety belt 11.

Figure 2:
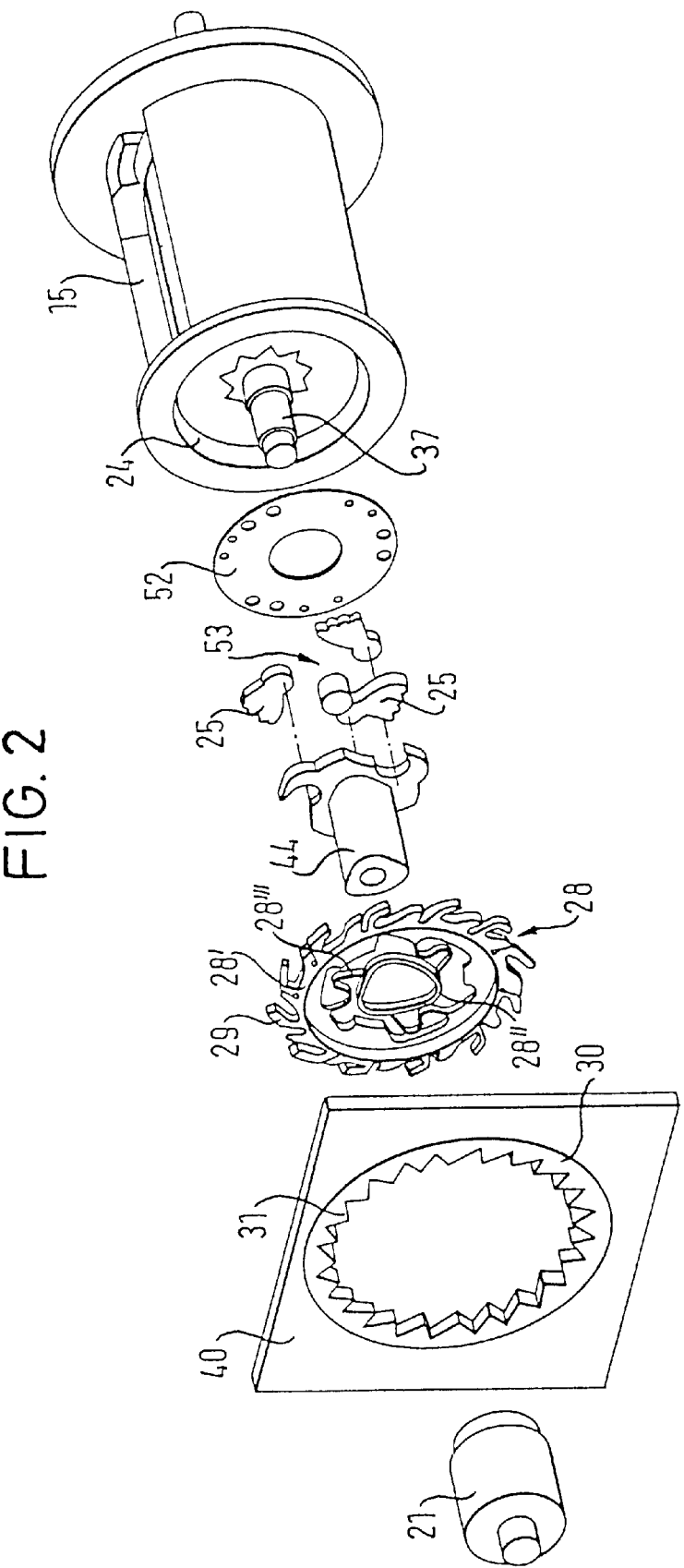

The coupling 20 is accommodated in a front cut-out 35 of the belt roller 15 and is covered over according to FIG. 3 in accordance with FIGS. 1, 2 and 7 by a cover plate 52 on the side facing the belt roller 15.

The functioning of the safety belt apparatus described is as follows:

As long as the belt tautener 18 has not been triggered, the coupling members 25 are in the disengaged position in accordance with FIGS. 3 and 4. The belt roller 15 can be rotated without hindrance or held fast depending on the influence of the spring mechanism 17, the unwind blocking apparatus 19, and the draw forces exerted on the safety belt 11.

If, however, the bet tautener 18 is triggered in an accident, then at first only the inner part 28'' (FIG. 6) of the ratchet wheel 28 and the disc 22 of the coupling 20 (FIG. 3) are rotated in the direction of the arrow 51, whereas the outer part 28' remains stationary. At this time, the (coupling members 25 abut the coupling-in abutments 26 and leave the disengaged position (in accordance with FIGS. 3 and 4) and enter into the engaged position (in accordance with FIG. 5) in which the coupling members 25 grip the inner wall of the coupling ring 24 with their clamping teeth 33 in a force transmitting manner. The coupling 20 is then moved by the coupling drive 34.

On further rotation of the belt tautener 18, the coupling members 25 force the coupling ring 24 and thus the belt roller 15 in the wind-up direction. As soon as the spring elements 28''' (FIG. 6) have been pressed together to such an extent that they can transmit a sufficient torque to the outer part 28', the outer part 28' of the ratchet wheel 28 is forced in a rotational movement in which the outer teeth 29 successively snap into the consecutive tooth depressions 48 of the inner tooth crown 30.

During the accident-caused tautening of the belt, the passenger (who is held by the belt) falls into the belt and exerts a correspondingly increasing draw force on the latter. This draw force creates a torque in the unwinding direction at the belt roller 15. As soon as this torque exceeds the counter-torque which is produced by the belt tautener 18, the coupling ring 24 rotates synchronously by an amount in the unwinding direction along with the coupling members 25, the disc 20 and the inner part 28''. At the same time, the spring elements 28''' increasingly relax and the conducting-in member 28' remain stationary until the coupling members 25 abut the conducting-out abutments 27 and are released from the coupling ring 24.

Since in an accident the unwind blocking apparatus 19 enters into the blocking position, the reversal of the direction of rotation of the belt roller 15 is possible only because the torsion bar 37 (which allows a definite relative rotational play) is located between it and the unwind blocking apparatus 19.

The coupling 20 is then disengaged, and the passenger who has fallen into the belt is caught gently while the torsion bar 37 continues to twist. At the same time, the passenger normally falls into an inflated airbag.

Should for some reason no noticeable draw force have arisen at the belt when the pyrotechnic charge of the belt tautener 18 is exhausted, the spring elements 28''' relax in the position seen in FIG. 6 as soon as the torque which is exerted by the belt tautener 18 is less than the restoring torque which resulted from the spring element 28'''. When this occurs, the inner part 28'' (and with it the axle stump 44) rotates counter to the direction of the arrow 51. In addition, the coupling members 25 leave the engagement position (in accordance with FIG. 5) and enter the disengaged position in accordance with (FIGS. 3, 4). As a result, the belt roller 15 is no longer subject to the influences of the run out belt tautener 18, which under appropriate circumstances hinder the rotational movement.

A substantial advantage of the present invention is that through the release of the coupling 20 during the tautening by the belt tautener 18, the belt force plot is approximately constant, after a relatively uniform increase at the start. In addition, the belt force plot has no excessive peak value.

A further advantage consists in that the coupling also opens under a load without problem. In this the ratchet wheel fulfills a multiple function.

To the disengaging of the coupling 20 a rotational play of approximately 15° is to be provided between the unwind blocking apparatus 19 and the belt roller 15, i.e. the belt roller 15 can rotate by this angle in the drawing-out direction relative to the blocking unwind blocking apparatus 19 under the influence of a specific belt draw force.

What is claimed is:

1. A safety belt apparatus for a motor vehicle body, comprising:
    a belt winder adapted to be connected to the vehicle body, the belt winder including a belt roller rotatable about a transverse axis;
    a safety belt connected to the belt winder and wound on the belt roller, the belt being adapted to be connected to a belt lock connected to the vehicle body;
    a belt tautener having an inner part and an outer part;
    a coupling positioned between the belt tautener and the belt roller, the coupling including a disc, a coupling ring, and coupling members; and
    an unwind blocking apparatus for blocking a further unwinding of the belt after a triggering event,
    wherein the belt roller is biased by a spring mechanism in a belt wind-up direction,
    wherein the belt winder is connected to the belt tautener and to the unwind blocking apparatus,
    wherein the coupling is biased toward a disengaged position and changes to an engaged position upon occurrence of the triggering event,
    wherein when the coupling moves to the engaged position, the belt roller is driven in the wind-up direction by the belt tautener,
    wherein the coupling can be automatically disengaged when a torque acting on the belt roller in the wind-up direction exceeds the torque exerted by the belt tautener,
    wherein a rotational play of a predetermined range is present between the inner part and the outer part, and
    wherein the coupling is adapted to move between the engaged and disengaged positions due to a relative movement between the inner part and the outer part within the rotational play range.

2. The apparatus of claim 1, wherein the coupling can be disengaged by rotating the belt roller in an unwind direction.

3. The apparatus of claim 1, wherein the coupling can be disengaged by rotating the inner part of the belt tautener in an unwind direction.

4. The apparatus of claim 3, wherein the inner part and the outer part form part of a ratchet wheel, and wherein the inner part and the outer part are connected by a rotational spring element.

5. The apparatus of claim 4, wherein the outer part comprises a ring disk surrounding the inner part, and wherein the outer part is coaxial with the inner part.

6. The apparatus of claim 4, wherein the outer part is adapted to be subjected to a bias force relative to the inner part so that in a rest position the coupling is maintained in the disengaged position, wherein at the beginning of the triggering event, the inner part of the belt tautener is adapted to rotate relative to the outer part so that the coupling is engaged, and wherein when the torque exerted by the belt tautener vanishes after the triggering event, the inner part is adapted to rotate relative to the outer part by an amount counter to the wind-up direction thereby enabling the coupling to be disengaged.

7. The apparatus of claim 4, wherein the disc is rotationally fixedly connected to the inner part of the belt tautener, and wherein the disc comprises a plurality of cut-outs, each cut-out receiving one of said coupling members.

8. The apparatus of claim 7, wherein the coupling ring surrounds the disc, and wherein the coupling ring is coaxial with the belt roller.

9. The apparatus of claim 7, wherein each of the coupling members is adapted to engage a conducting-in abutment and a conducting-out abutment.

10. The apparatus of claim 9, wherein the conducting-in abutment is connected to the ratchet wheel, wherein the ratchet wheel is coaxial with the transverse axis.

11. The apparatus of claim 10, wherein a perimeter of the ratchet wheel includes outer teeth and wherein the outer teeth cooperate with a inner tooth crown fixed to a housing.

12. The apparatus of claim 11, wherein the inner tooth crown includes at least twice as many inner teeth as the number of outer teeth located on the ratchet wheel.

13. The apparatus of claim 7, wherein the coupling members are claws which are pivotally journalled in the cut-outs in the disc, wherein the coupling members are adapted to rotate on axes which extend parallel to the transverse axis, and wherein the claws have radially outwardly clamping teeth.

14. The apparatus of claim 1, wherein the coupling is engaged when the belt tautener begins to rotate.

15. The apparatus of claim 1, wherein the spring mechanism and the unwind blocking apparatus are provided on a first side of the belt roller, and wherein the coupling, a coupling drive, and the belt tautener are provided on a second side the belt roller.

16. The apparatus of claim 15, wherein the coupling comprises an outwardly open concentric cut-out at the second side of the belt roller.

17. The apparatus of claim 16, wherein the cut-out is surrounded by the coupling ring, and wherein the coupling ring is connected to the belt roller.

18. The apparatus of claim 15, wherein the coupling drive covers a cut-out on the second side of the belt roller.

19. The apparatus of claim 1, wherein a rotational play is present between the belt roller and the unwind blocking apparatus so that after the engagement of the unwind blocking apparatus, the belt roller can rotate under the influence of a belt drawing force generated by the triggering event.

20. The apparatus of claim 19, wherein the unwind blocking apparatus is rotationally fixedly connected to a first side of the belt roller, wherein the unwind blocking apparatus is connected to the belt roller by a torsion bar coaxial with the belt roller, wherein the torsion bar is in a cavity in the belt roller open to the first side, and wherein the torsion bar provides the rotational play between the unwind blocking apparatus and the belt roller.

21. The apparatus of claim 20, wherein the torsion bar is plastically deformable.

22. The apparatus of claim 21, wherein when the blocking apparatus moves to a blocking position and thereby causes the torsion bar to twist, a twisting counter-force of the torsion bar increases, and wherein during a further twisting of the torsion bar the twisting counter-force remains substantially constant.

23. A safety belt apparatus for a motor vehicle body, comprising:

a belt winder adapted to be connected to the vehicle body, the belt winder including a belt roller rotatable about a transverse axis;

a safety belt connected to the belt winder and wound on the belt roller, the belt being adapted to be connected to a belt lock connected to the vehicle body;

a belt tautener including a ratchet wheel having an inner part and an outer part;

a coupling positioned between the belt tautener and the belt roller, the coupling including a disc, a coupling ring, and coupling members; and an unwind blocking apparatus for blocking a further unwinding of the belt after a triggering event, wherein the belt roller is biased by a spring mechanism in a belt wind-up direction, wherein the belt winder is connected to the belt tautener and to the unwind blocking apparatus, wherein the coupling is biased toward a disengaged position and changes to an engaged position upon occurrence of the triggering event, wherein when the coupling moves to the engaged position, the belt roller is driven in the wind-up direction by the belt tautener, wherein the coupling can be automatically disengaged when a torque acting on the belt roller in the wind-up direction exceeds the torque exerted by the belt tautener, and wherein the ratchet wheel has a perimeter at which the ratchet wheel comprises elastically deformable outer teeth cooperating with a housing-fixed inner tooth crown.

24. The apparatus of claim 23, wherein the inner tooth crown includes at least twice as many inner teeth as the number of outer teeth on the ratchet wheel.

25. A safety belt apparatus for a motor vehicle body, comprising:

a belt winder adapted to be connected to the vehicle body, the belt winder including a belt roller rotatable about a transverse axis;

a safety belt connected to the belt winder and wound on the belt winder, the belt being adapted to be connected to a belt lock connected to the vehicle body;

a belt tautener including a ratchet wheel having an inner part and an outer part, the inner and outer parts being connected by a first spring mechanism;

a coupling positioned between the belt tautener and the belt roller, the coupling including a disc, a coupling ring, and coupling members; and an unwind blocking apparatus for blocking a further unwinding of the belt after a triggering event, wherein the belt roller is biased by a second spring mechanism in a belt wind-up direction, wherein the belt winder is connected to the belt tautener and to the unwind blocking apparatus, wherein the coupling is biased toward a disengaged position and changes to an engaged position upon occurrence of the triggering event, wherein when the coupling moves to the engaged position, the belt roller is driven in the wind-up direction by the belt tautener, and wherein the coupling can be automatically disengaged when a torque acting on the belt roller in the wind-up direction exceeds the torque exerted by the belt tautener.

* * * * *